United States Patent
Salgues

(10) Patent No.: US 9,428,011 B2
(45) Date of Patent: Aug. 30, 2016

(54) CORD RUBBERIZED IN SITU COMPRISING A COMPOSITION COMPRISING A STYRENE-BUTADIENE COPOLYMER

(71) Applicants: CAMPAIGN GENERALE DES ETABLISSEMENTS MICHELIN, Clermont-Ferrand (FR); Michelin Recherche et Technique S.A., Granges-Paccot (CH)

(72) Inventor: Nathalie Salgues, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 14/430,706

(22) PCT Filed: Oct. 29, 2013

(86) PCT No.: PCT/EP2013/072551
§ 371 (c)(1),
(2) Date: Mar. 24, 2015

(87) PCT Pub. No.: WO2014/067916
PCT Pub. Date: May 8, 2014

(65) Prior Publication Data
US 2015/0246581 A1  Sep. 3, 2015

(30) Foreign Application Priority Data
Oct. 30, 2012 (FR) ...................... 12 60337

(51) Int. Cl.
*B60C 9/00* (2006.01)
*B60C 1/00* (2006.01)
(Continued)

(52) U.S. Cl.
CPC ............... *B60C 9/0007* (2013.04); *B60C 1/00* (2013.01); *B60C 15/00* (2013.01); *C08F 236/10* (2013.01);
(Continued)

(58) Field of Classification Search
CPC ................... C08F 236/10; C08L 9/06; B60C 2009/0021; B60C 9/007; B60C 9/00; D07B 1/0606
See application file for complete search history.

(56) References Cited

U.S. PATENT DOCUMENTS 4,503,204 A    3/1985  Bingham et al. ............. 526/187
7,285,605 B1 * 10/2007  Halasa .................. C08F 236/10
                                                              525/272
(Continued)

FOREIGN PATENT DOCUMENTS

DE  10 2010 017 501 A1   12/2011
FR     2 954 332 A1 *    6/2011 ................ C08L 9/00
(Continued)

OTHER PUBLICATIONS

"Micro-Alloyed Steel Cord Constructions for Tyres," No. 34984, Research Disclosure, pp. 333-345 (May 1993).
(Continued)

*Primary Examiner* — Rip A Lee
(74) *Attorney, Agent, or Firm* — Fitzpatrick, Cella, Harper & Scinto

(57) ABSTRACT

A metal cord is rubberized in situ by a rubber composition that includes a styrene-butadiene copolymer. The styrene-butadiene copolymer includes styrene units at a proportion of between 25% and 35% by weight, limits included, of a total weight of the styrene-butadiene copolymer. The styrene-butadiene copolymer also includes trans-1,4-bonds at a proportion of between 73% and 83% by weight, limits included, of a total weight of a butadiene part of the styrene-butadiene copolymer.

12 Claims, 2 Drawing Sheets

(51) Int. Cl.
*C08F 236/10* (2006.01)
*C08L 9/06* (2006.01)
*B60C 15/00* (2006.01)
*C08K 13/02* (2006.01)
*D07B 1/06* (2006.01)

(52) U.S. Cl.
CPC ............... *C08K 13/02* (2013.01); *C08L 9/06* (2013.01); *D07B 1/062* (2013.01); *B60C 2009/0021* (2013.04); *D07B 1/0613* (2013.01); *D07B 1/0626* (2013.01); *D07B 1/0633* (2013.01); *D07B 1/0646* (2013.01); *D07B 2201/2002* (2013.01); *D07B 2201/2005* (2013.01); *D07B 2201/2046* (2013.01); *Y10T 29/49826* (2015.01)

(56) References Cited

U.S. PATENT DOCUMENTS

| | | | |
|---|---|---|---|
| 7,820,771 B2 | 10/2010 | Lapra et al. | 525/479 |
| 8,474,235 B2 | 7/2013 | Pottier et al. | 57/217 |
| 8,627,696 B2 | 1/2014 | Pottier et al. | 72/64 |
| 8,863,490 B2* | 10/2014 | Boisseau | D07B 1/0613 57/223 |
| 2009/0270558 A1 | 10/2009 | Gandon-pain et al. | 525/190 |
| 2011/0132512 A1* | 6/2011 | Inui | B60C 1/00 152/451 |
| 2011/0198008 A1 | 8/2011 | Pottier et al. | 152/451 |
| 2012/0102909 A1* | 5/2012 | Pottier | D07B 1/0633 57/17 |
| 2012/0125512 A1 | 5/2012 | Pottier et al. | 152/556 |
| 2012/0174557 A1 | 7/2012 | Boisseau et al. | 57/213 |
| 2013/0030097 A1* | 1/2013 | Salgues | B60C 1/0016 524/186 |
| 2013/0146198 A1* | 6/2013 | Chang | D02G 3/48 152/526 |
| 2013/0220505 A1* | 8/2013 | Pottier | D07B 1/0633 152/451 |

FOREIGN PATENT DOCUMENTS

| | | |
|---|---|---|
| WO | WO 97/36724 A2 | 10/1997 |
| WO | WO 99/16600 A1 | 4/1999 |
| WO | WO 03/016837 A1 | 2/2003 |
| WO | WO 2006/069792 A1 | 7/2006 |
| WO | WO 2006/069793 A1 | 7/2006 |
| WO | WO 2009/083213 A1 | 7/2009 |
| WO | WO 2010/000299 A1 | 1/2010 |
| WO | WO 2010/012411 A1 | 2/2010 |
| WO | WO 2010/054790 A1 | 5/2010 |
| WO | WO 2010/054791 A1 | 5/2010 |
| WO | WO 2011/000963 A2 | 1/2011 |
| WO | WO 2011/144472 A1 * | 11/2011 ............... D07B 1/16 |
| WO | WO 2011/147710 A1 * | 12/2011 ............... D07B 1/06 |

OTHER PUBLICATIONS

"High Tensile Strength Steel Cord Constructions for Tyres," No. 34054, Research Disclosure, pp. 624-633 (Aug. 1992).

* cited by examiner

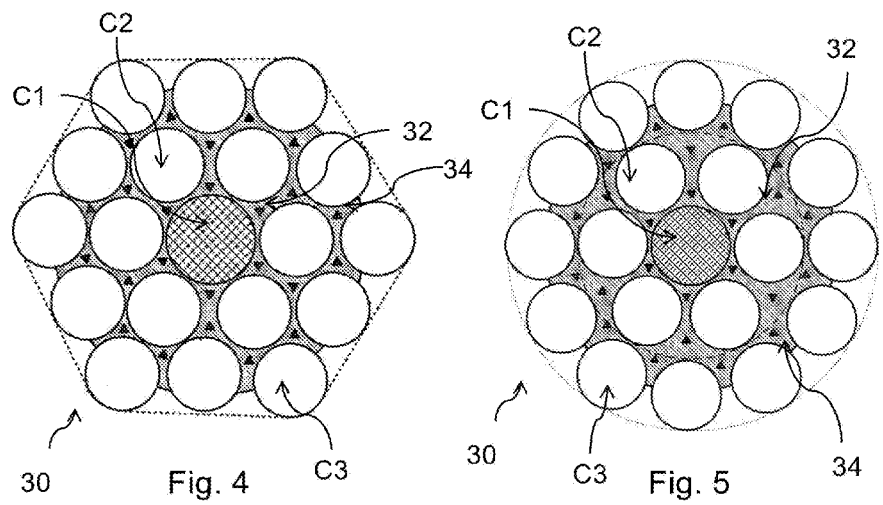
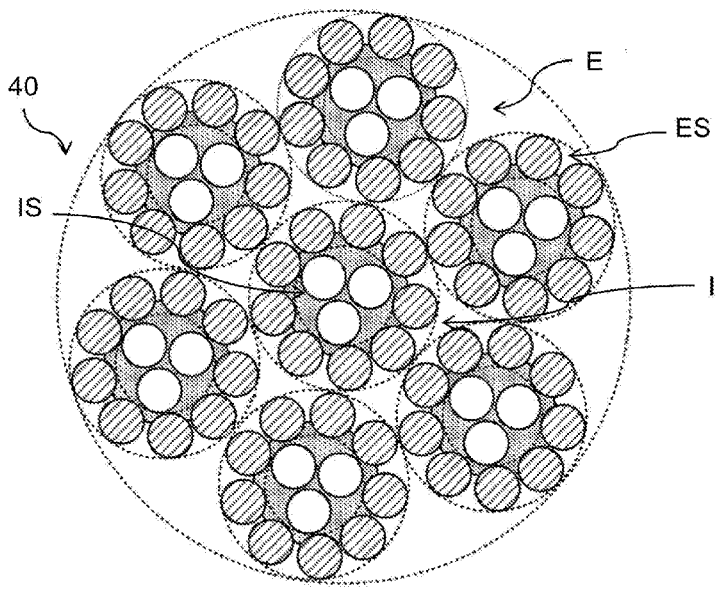
Fig. 6

CORD RUBBERIZED IN SITU COMPRISING A COMPOSITION COMPRISING A STYRENE-BUTADIENE COPOLYMER

FIELD OF THE INVENTION

The invention relates to a metal cord rubberized in situ for the reinforcing of tyres, particularly of tyres for heavy industrial vehicles.

RELATED ART

There is known, from the state of the art, in particular from the document WO 2009/083213, a two-layer cord rubberized in situ comprising internal and external layers and a layer of a rubber composition sheathing the internal layer. Thus, each capillary or gap located between the threads of the internal layer and between the threads of the internal and external layers is at least partially filled, continuously or noncontinuously, along the axis of the cord, with the rubber composition.

This cord is assembled, for example by cabling, in a plant employing a manufacturing process in which the threads of the internal layer are wound into a helix. The internal layer, thus wound, is then passed into an extrusion head in order to sheathe it with the layer of the rubber composition. Subsequently, the threads of the external layer are wound into a helix around the intermediate layer thus sheathed. The cord is then passed into balancing means of the plant comprising, for example, a twister or a twister/straightener. Finally, the cord is stored on a storage reel.

In the case where the amount of the rubber composition is not precisely controlled, either the rubber composition radially overflows at the periphery of the cord (case where the amount of the rubber composition is too high) or the rubber composition does not fill all the capillaries or gaps of the cord (case where the amount of the rubber composition is too low). In particular, in the case where the amount of the rubber composition is too high, the excess of this composition is deposited in the plant, in particular on the balancing means and the storage means. In point of fact, the continual fouling of these means by the rubber necessitates regular shutdowns of the plant in order to clean them, which is not desirable if it is wished to make continuous use of the plant.

Even if it is effective, the precise control of the amount of the rubber composition is relatively restricting industrially.

BRIEF DESCRIPTION OF EMBODIMENTS OF THE INVENTION

An aim of the invention is thus a means which is simple and not very restricting industrially of preventing the radial overflowing of the rubber composition.

To this end, a subject-matter of the invention is a metal cord rubberized in situ by a rubber composition comprising a styrene-butadiene copolymer comprising:
  a proportion of styrene units of between 25% and 35%, limits included, by weight of the total weight of the copolymer, and
  a proportion of trans-1,4-bonds of between 73% and 83%, limits included, by weight of the total weight of the butadiene part of the copolymer.

The styrene-butadiene copolymer confers, on the rubber composition, a lower fluidity than that conferred by other diene elastomers, in particular natural rubber. Thus, during the sheathing of the cord according to the invention, the risk of radial overflowing of the rubber composition is reduced, indeed even eliminated.

The copolymer comprises units resulting from the copolymerization of styrene, for example styrene units (with a weight y). The copolymer also comprises units resulting from the copolymerization of butadiene, for example trans-1,4-butene units, forming trans-1,4-bonds (with a weight x), and optionally cis-1,4-butene units, forming cis-1,4-bonds (with a weight n) and vinyl bonds (with a weight m, also known as 1,2-butene units).

Thus, in accordance with the invention, $25\% \leq y/(n+m+x+y) \leq 35\%$ and $73\% \leq x/(n+m+x) \leq 83\%$.

In a known way, the styrene-butadiene copolymer (SBR for styrene-butadiene rubber) must not be confused with the thermoplastic elastomers resulting from the polymerization of blocks of styrene-butadiene monomers which are identical, also known as block copolymers. Thus, the styrene-butadiene copolymer is a diene and a nonthermoplastic one.

Rubber composition is understood to mean that the composition comprises at least one elastomer or one rubber (the two terms being synonyms) and at least one additive.

In the present description, unless expressly indicated otherwise, all the percentages (%) shown are % by weight. The abbreviation "phr" means parts by weight per hundred parts of solid elastomer.

The cord of the invention is a cord rubberized in situ, that is to say that it is rubberized from the inside, during its actual manufacture (thus in the raw manufacturing state), by the rubber. In other words, each of the capillaries or gaps (the two interchangeable terms denoting the voids or free spaces in the absence of the rubber composition) located between the threads of one and the same layer and of two adjacent layers are at least partially filled, continuously or noncontinuously, along the axis of the cord, by the rubber composition.

Advantageously, the proportion of styrene units is between 27% and 31%, limits included, by weight of the total weight of the copolymer, and Advantageously, the proportion of trans-1,4-bonds is between 75% and 81%, limits included, by weight of the total weight of the butadiene part of the copolymer.

Preferably, the copolymer comprises a proportion of cis-1,4-bonds of between 12% and 21%, limits included, preferably between 14% and 19%, limits included, by weight of the total weight of the butadiene part of the copolymer.

Preferably, the copolymer comprises a proportion of vinyl units of between 1% and 7%, limits included, preferably between 3% and 5%, limits included, by weight of the total weight of the butadiene part of the copolymer.

The composition can comprise, in addition to the styrene-butadiene copolymer in accordance with the invention, one or more other diene elastomers, for example natural rubber.

In one embodiment, the rubber composition comprises between 50 and 100 phr, limits included, preferably between 70 and 100 phr, limits included, and more preferably between 80 and 100 phr, limits included, of the styrene-butadiene copolymer.

In a preferred embodiment, the composition comprises, as sole diene elastomer, the styrene-butadiene copolymer. In other words, in this embodiment, the composition does not comprise other diene elastomers than the styrene-butadiene copolymer or alternatively the styrene-butadiene copolymer constitutes the only diene elastomer of the composition.

In the present description, unless expressly indicated otherwise, all the percentages (%) shown are % by weight. The abbreviation "phr" means parts by weight per hundred parts of solid elastomer.

Preferably, the composition comprises a reinforcing filler.

When a reinforcing filler is used, use may be made of any type of reinforcing filler known for its capabilities in reinforcing a rubber composition which can be used for the manufacture of tyres, for example an organic filler, such as carbon black, a reinforcing inorganic filler, such as silica, or also a blend of both these types of filler, in particular a blend of carbon black and of silica.

All the carbon blacks conventionally used in tyres ("tyre-grade" blacks) are suitable as carbon blacks.

Mention may be made, as examples of organic fillers other than carbon blacks, of functionalized polyvinylaromatic organic fillers, such as described in Applications WO-A-2006/069792 and WO-A-2006/069793.

"Reinforcing inorganic filler" should be understood as meaning, in the present patent application, by definition, any inorganic or mineral filler (whatever its colour and its origin (natural or synthetic)), also known as "white filler", "clear filler" or indeed even "non-black filler", in contrast to carbon black, capable of reinforcing by itself alone, without means other than an intermediate coupling agent, a rubber composition intended for the manufacture of tyres, in other words capable of replacing, in its reinforcing function, a conventional tyre-grade carbon black. Such a filler is generally characterized, in a known way, by the presence of hydroxyl (—OH) groups at its surface.

The physical state under which the reinforcing inorganic filler is provided is not important, whether this is in the form of a powder, of microbeads, of granules, of beads or any other appropriate densified form. Of course, reinforcing inorganic filler is also understood to mean mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to a person skilled in the art, in particular any precipitated silica or fumed silica exhibiting a BET specific surface and also a CTAB specific surface both of less than 450 $m^2/g$, preferably from 30 to 400 $m^2/g$. Mention may be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber, or silicas having a high specific surface, such as described in Application WO 03/16837.

Finally, a person skilled in the art will understand that use might be made, as filler equivalent to the reinforcing inorganic filler described in the present section, of a reinforcing filler of another nature, in particular organic nature, provided that this reinforcing filler is covered with an inorganic layer, such as silica, or else comprises, at its surface, functional sites, in particular hydroxyl sites, requiring the use of a coupling agent in order to establish the bond between the filler and the elastomer.

The content of total reinforcing filler (carbon black and/or reinforcing inorganic filler, such as silica) is within a range from 10 to 100 phr, limits included, more preferably from 20 to 90 phr, limits included, and more particularly from 30 to 80 phr, limits included.

Carbon black can advantageously constitute the predominant reinforcing filler and preferably the only reinforcing filler. Predominant is understood to mean that the proportion by weight of carbon black is greater than the proportion by weight of the remainder of the other reinforcing fillers of the composition, whether these fillers are organic or inorganic, such as, for example, silica.

Preferably, the rubber composition comprises between 20 and 70 phr, limits included, preferably between 30 and 70 phr, limits included, and more preferably between 35 and 60 phr, limits included, of carbon black.

Of course, use may be made of just one carbon black or a blend of several carbon blacks of different ASTM grades. The carbon black can also be used as a blend with other reinforcing fillers and in particular reinforcing inorganic fillers as described above, in particular silica.

Preferably, the composition comprises various additives.

The compositions can also comprise all or a portion of the usual additives generally used in elastomer compositions intended for the manufacture of tyres, such as, for example, plasticizers or extending oils, whether the latter are aromatic or nonaromatic in nature, pigments, protection agents, such as antiozone waxes, chemical antiozonants or antioxidants, antifatigue agents, reinforcing resins, such as bismaleimides, for example rosin, methylene acceptors (for example, phenolic novolak resin) or methylene donors (for example, HMT or H3M), and nonreinforcing fillers, such as chalk or talc.

Preferably, use is commonly made of an adhesion promoter, for example a cobalt or nickel salt, for the compositions intended to be in contact with a metal reinforcing element.

In one embodiment, the composition comprises a crosslinking system, more preferably a vulcanization system.

In this embodiment, the crosslinking system, in this instance the vulcanization system, is based on sulphur-donating agents, for example sulphur, and/or on peroxides and/or on bismaleimides and comprises vulcanization accelerators, vulcanization activators or vulcanization retarders.

The vulcanization system comprises sulphur and an accelerator. Preferably, the accelerator is chosen from tetrabenzylthiuram disulphide (abbreviated to "TBZTD"), the family of the sulphenamides consisting of 2-mercaptobenzothiazyl disulphide (abbreviated to "MBTS"), N-cyclohexyl-2-benzothiazolesulphenamide (abbreviated to "CBS"), N,N-dicyclohexyl-2-benzothiazolesulphenamide (abbreviated to "DCBS") and N-(tert-butyl)-2-benzothiazolesulphenamide (abbreviated to "TBBS"), N-(tert-butyl)-2-benzothiazolesulphenimide (abbreviated to "TBSI") and the mixtures of these compounds.

The vulcanization system comprises other vulcanization accelerators and activators, such as zinc oxide, stearic acid or a guanidine derivative (for example diphenylguanidine). The vulcanization system also comprises a vulcanization retarder, such as N-(cyclohexylthio)phthalimide (abbreviated to "CTP").

The sulphur or sulphur-donating agent is used at a preferred content of between 0.5 and 10 phr, limits included, more preferably of between 0.5 and 5.0 phr, limits included. The combination of the vulcanization accelerators, retarders and activators is used at a preferred content of between 0.5 and 15 phr, limits included. The primary vulcanization accelerator is used at a preferred content of between 0.5 and 10 phr, limits included, more preferably of between 0.5 and 5.0 phr, limits included.

Advantageously, the glass transition temperature of the styrene-butadiene copolymer, measured according to the standard ASTM D-3418, is between −51° C. and −59° C., limits included, and preferably between −53° C. and −57° C., limits included.

Preferably, the Mooney plasticity of the composition is greater than or equal to 70 Mooney units, preferably greater than or equal to 75 Mooney units and more preferably greater than or equal to 80 Mooney units.

According to a preferred embodiment, over every cord portion with a length equal to 3 cm, more preferably equal to 2 cm, each capillary or gap described above comprises at least one rubber plug; in other words and preferably, there exists at least one rubber plug every 3 cm, preferably every 2 cm, of cord which obstructs each capillary or gap of the cord in such a way that, in the air permeability test described below, this cord exhibits, for at least 90% of the measurements, a mean air flow rate of less than 2 cm$^3$/min, more preferably of less than or at the most equal to 0.2 cm$^3$/min.

In one embodiment, the cord comprises several layers of threads, at least one layer of threads being sheathed by the rubber composition.

In one embodiment, the cord comprises at least one saturated layer of N threads, that is to say that there does not exist sufficient room in this layer to add thereto at least one (N+1)th thread of the same diameter as the N threads of this layer, N then representing the maximum number of threads which can be wound into a layer around the layer.

In another embodiment, the cord comprises at least one unsaturated layer of N threads, that is to say that there exists sufficient room in this layer to add thereto at least one (N+1)th thread of the same diameter as the N threads of this layer.

In one embodiment, the cord is compact. The layers of the cord are then wound in the same twist direction (S or Z) and at the same pitch. In such cords comprising compact layers, the compactness is such that virtually no distinct layer of threads is visible; the result of this is that the cross-section of such cords has an outline which is polygonal and noncylindrical.

In one embodiment, the cord is noncompact, also known as having cylindrical layers. The layers of the cord are wound either at different pitches or along different twist directions.

Independently of one another and from one layer to the other, the thread or threads of the different layers are preferably made of steel, more preferably of carbon steel. However, it is, of course, possible to use other steels, for example a stainless steel, or other alloys.

Metal cord is understood to mean, by definition, a cord formed of threads predominantly (that is to say, for more than 50% of these threads) or wholly (for 100% of the threads) composed of a metal material. The invention is preferably implemented with a cord made of carbon steel, more preferably of pearlitic (or ferrite-pearlitic) carbon steel, denoted hereinafter by "carbon steel", or also made of stainless steel (by definition, steel comprising at least 11% of chromium and at least 50% of iron). However, it is, of course, possible to use other steels or other alloys.

When a carbon steel is used, its carbon content (% by weight of steel) is preferably between 0.4% and 1.2%, in particular between 0.5% and 1.1%; these contents represent a good compromise between the mechanical properties required for the tyre and the feasibility of the threads. It should be noted that a carbon content of between 0.5% and 0.6% renders such steels less expensive in the end as they are easier to draw. Another advantageous embodiment of the invention can also consist, depending on the applications targeted, in using steels having a low carbon content, for example between 0.2% and 0.5%, due in particular to a lower cost and a greater ease of drawing.

The metal or the steel used, whether it is in particular a carbon steel or a stainless steel, can itself be coated with a metal layer which improves, for example, the processing properties of the metal cord and/or of its constituent elements or the operating properties of the cord and/or of the tyre themselves, such as the properties of adhesion, of resistance to corrosion or of resistance to ageing.

According to a preferred embodiment, the steel used is covered with a layer of brass (Zn—Cu alloy) or of zinc. It should be remembered that, during the process for the manufacture of the threads, the brass or zinc coating facilitates the drawing of the thread and also the adhesive bonding of the thread with the rubber. However, the threads might be covered with a thin metal layer other than brass or zinc, for example having the role of improving the corrosion resistance of these threads and/or their adhesion to the rubber, for example a thin layer of Co, Ni or Al or of an alloy of two or more of the compounds Cu, Zn, Al, Ni, Co and Sn.

A person skilled in the art knows how to manufacture steel threads exhibiting such characteristics by adjusting in particular the composition of the steel and the degrees of final work-hardening of these threads, according to his own specific needs, for example using micro-alloyed carbon steels comprising specific addition elements, such as Cr, Ni, Co or V, or various other known elements (see, for example, Research Disclosure 34984—"Micro-alloyed steel cord constructions for tyres"—May 1993; Research Disclosure 34054—"High tensile strength steel cord constructions for tyres"—August 1992).

In one embodiment, the cord comprises an internal layer of threads and an external layer of threads wound around the internal layer. Such a cord is of the two-layer type. Preferably, the cord comprises a layer of the rubber composition sheathing the internal layer.

Conventionally, the two-layer cord exhibits an M+N structure with, for example, M=3 and N=9.

In another embodiment, the cord comprises an intermediate layer of threads wound around the internal layer, the threads of the external layer being wound around the intermediate layer. Such a cord is of the three-layer type. Preferably, the cord comprises an internal layer of the rubber composition sheathing the internal layer and/or an intermediate layer of the rubber composition sheathing the intermediate layer.

Conventionally, the three-layer cord exhibits an M+N+P structure with, for example, M=1, N=6 and P=12.

In both the preceding embodiments, the cord comprises a layer of the rubber composition sheathing at least one nonexternal layer of the cord.

In one embodiment, the cord comprises several layers of strands, at least one layer of strands being sheathed by the rubber composition.

Such a cord is known as a multistrand rope and exhibits, for example, an (N+M)×(P+Q) structure, that is to say a structure comprising an internal layer of N strand(s) around which is wound an external layer of M strands. Each internal and external layer strand comprises an internal layer of P threads around which is wound an external layer of Q threads. An example of a multistrand rope is that having the (1+6)×(3+9) structure. In this embodiment, at least one layer of strands is sheathed, independently of the fact that the layers of threads of each strand are also sheathed or nonsheathed.

Another subject-matter of the invention is a semifinished product comprising a metal cord as defined above embedded in a coating rubber composition.

Examples of semifinished products are crown reinforcement plies and carcass reinforcement plies.

According to one embodiment of the invention, the sheathing rubber composition can be chosen to be identical to the coating rubber composition with which it is in contact. Thus, there is no problem of compatibility between the sheathing and coating compositions.

According to another embodiment of the invention, the sheathing rubber composition can be chosen to be different from the coating rubber composition with which it is in contact. Of course, it will be possible to adjust the sheathing and coating compositions for the purpose of optimizing the compatibility and the properties of each.

In addition, a subject-matter of the invention is a tyre comprising a metal cord as defined above.

Moreover, a subject-matter of the invention is the use, in a cord rubberized in situ, of a styrene-butadiene copolymer comprising:
  a proportion of styrene units of between 25% and 35%, limits included, by weight of the total weight of the copolymer, and
  a proportion of trans-1,4-bonds of between 73% and 83%, limits included, by weight of the total weight of the butadiene part of the copolymer, in a rubber composition as viscosity controller.

Finally, a subject-matter of the invention is a process for the manufacture of a metal cord rubberized in situ by a rubber composition, in which:
  the rubber composition comprising a styrene-butadiene copolymer comprising:
  a proportion of styrene units of between 25% and 35%, limits included, by weight of the total weight of the copolymer, and
  a proportion of trans-1,4-bonds of between 73% and 83%, limits included, by weight of the total weight of the butadiene part of the copolymer, is manufactured,
  at least an internal portion of the metal cord is sheathed with the rubber composition between two stages of assembling the metal cord.

BRIEF DESCRIPTION OF THE DRAWINGS

A better understanding of the invention will be obtained on reading the description which will follow, given solely by way of nonlimiting example and made with reference to the drawings, in which:

FIG. 2 is a sectional view perpendicular to the axis of the cord (assumed rectilinear and at rest) of a cord according to a first embodiment of the invention;

FIGS. 3 to 5 are views analogous to that of FIG. 2 of cords according to second, third and fourth embodiments respectively; and FIG. 6 is a view analogous to that of FIG. 2 of a multistrand rope according to the invention.

DETAILED DESCRIPTION OF EMBODIMENTS OF THE INVENTION

Example of a Tyre According to the Invention

Figure 1:
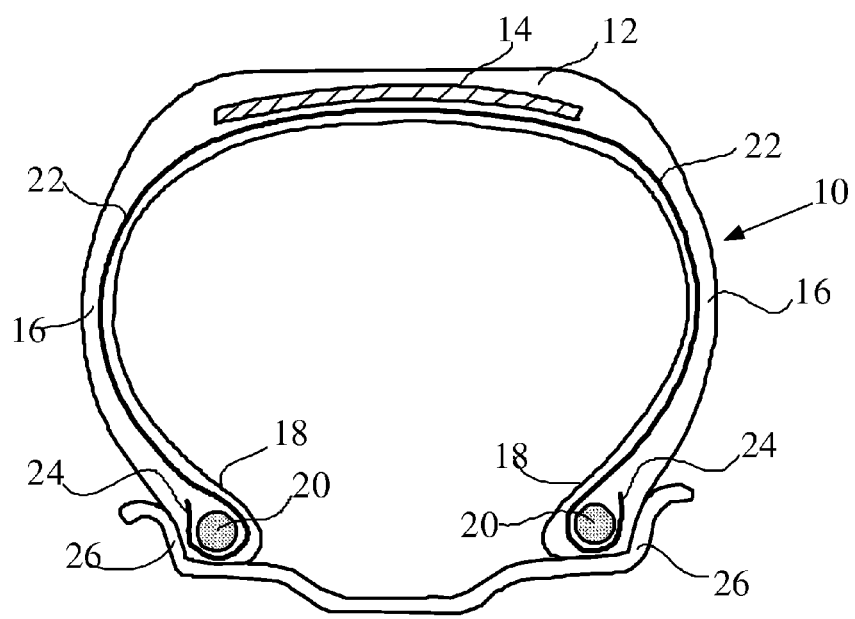
FIG. 1 is a sectional view perpendicular to the circumferential direction of a tyre according to the invention.

An example of a tyre according to the invention, denoted by the general reference 10, has been represented in FIG. 1.

The tyre 10 comprises a crown 12 reinforced by a crown reinforcement 14, two sidewalls 16 and two beads 18, each of these beads 18 being reinforced with a bead wire 20. The crown 12 is surmounted by a tread, not represented in this schematic figure. A carcass reinforcement 22 is wound around the two bead wires 20 in each bead 18 and comprises a turn-up 24 positioned towards the outside of the tyre 10, which is here represented fitted to a wheel rim 26.

The carcass reinforcement 22 is, in a way known per se, composed of at least one ply reinforced by cords, known as "radial" cords, that is to say that these cords are positioned virtually parallel to one another and extend from one bead to the other so as to form an angle of between 80° and 90° with the median circumferential plane (plane perpendicular to the axis of rotation of the tyre which is situated at mid-distance from the two beads 18 and passes through the middle of the crown reinforcement 14).

Each crown reinforcement 14 and carcass reinforcement 22 respectively comprises at least one crown ply and one carcass ply, all or a portion of the reinforcement cords of which are metal cords in accordance with the invention.

In the crown reinforcement 14, represented diagrammatically in a very simple way in FIG. 1, it will be understood that the cords of the invention can, for example, reinforce all or a portion of the working crown plies or of the triangulation crown plies (or half-plies) and/or of the protective crown plies, when such triangulation or protective crown plies are used. In addition to the working plies and the triangulation and/or protective plies, the crown reinforcement 14 of the tyre of the invention can, of course, comprise other crown plies, for example one or more hooping crown plies.

The tyre 10 is intended, for example, for vehicles chosen from passenger vehicles or industrial vehicles, the latter being chosen from vans, heavy vehicles, such as "heavy-duty" vehicles—i.e., underground, bus, heavy road transport vehicles (lorries, tractors, trailers) or off-road vehicles—agricultural vehicles or earth moving equipment, aircraft, or other transportation or handling vehicles. Preferably, the tyre 10 is intended for the industrial vehicles described above. More preferably, the tyre is intended for a vehicle of heavy-duty type.

Examples of Cords According to the Invention

Figures 2, 3:
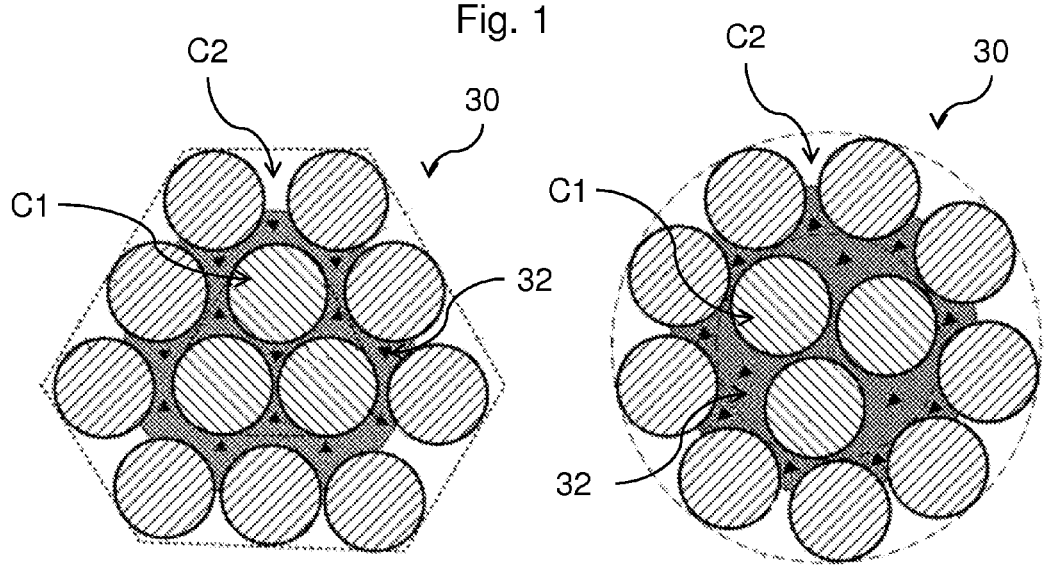

An example of a cord 30 according to a first embodiment has been represented in FIG. 2. The cord 30 is made of metal and is of the two-layer type, independently of the presence or absence of a hooping layer.

The cord 30 comprises an internal layer C1 composed of M internal threads wound into a helix with a pitch p1. In this instance, M=3.

The cord 30 also comprises an intermediate layer C2 consisting of N intermediate threads wound into a helix with the pitch p2 around the internal layer C1. In this instance, N=9.

The directions of winding of the layer threads are all identical, that is to say either in the S direction ("S/S" arrangement) or in the Z direction ("Z/Z" arrangement).

The cord 30 is of the compact type. All the layers of threads constituting it exhibit the same pitch (p1=p2) and the same direction of winding (S or Z). Each layer C1, C2 exhibits a noncylindrical exterior which gives the corresponding layer C1, C2 respectively its polygonal outline.

Each diameter d1, d2 is between 0.22 and 0.50 mm, limits included. In this instance, all the threads of the layers C1, C2 exhibit the same diameter d1=d2.

The threads of the layers C1, C2 are preferably made of carbon steel coated with brass. The threads made of carbon steel are prepared in a known way, starting, for example, from wire rods (diameter 5 to 6 mm) which are first of all work hardened, by rolling and/or drawing, down to an intermediate diameter of approximately 1 mm.

The steel used for the cord 30 is a carbon steel, the carbon content of which is 0.7%, the remainder being composed of iron and of the usual inevitable impurities related to the process for manufacturing the steel. In an alternative form, use is made of a carbon steel, the carbon content of which is approximately 0.92% and which comprises approximately 0.2% of chromium. The threads with an intermediate diameter are subjected to a degreasing and/or stripping treatment, before their subsequent conversion. After deposition of a brass coating on these intermediate threads, a work-hardening referred to as "final" (i.e., after the last patenting heat treatment) is carried out on each thread, by cold-drawing in a wet medium with a drawing lubricant which is provided, for example, in the form of an aqueous emulsion or dispersion. The brass coating which surrounds the threads has a very low thickness, markedly less than a micrometer, for example of the order of 0.15 to 0.30 µm, which is negligible in comparison with the diameter of the steel threads. Of course, the composition of the steel of the thread in its different elements (for example, C, Cr or Mn) is the same as that of the steel of the starting thread.

The cord 30 also comprises a layer 32 of a rubber composition sheathing the internal layer C1. For any length of cord of 2 cm or more, the rubber layer 32 is present in the central channel formed by the three core threads and in each of the gaps or capillaries located between the M core threads and the N threads of the external layer C2 located by black triangles in the figures.

The rubber composition of the layer 32 comprises a diene elastomer, in the case in point a styrene-butadiene copolymer (SBR). The rubber composition 32 comprises between 50 and 100 phr, limits included, preferably between 70 and 100 phr, limits included, and more preferably between 80 and 100 phr, limits included, of the styrene-butadiene copolymer. In the case in point, the styrene-butadiene copolymer constitutes all (100 phr) of the diene elastomer.

The composition 32 also comprises a reinforcing filler, a crosslinking system which comprises sulphur, an accelerator and various additives.

The styrene-butadiene copolymer comprises a proportion of styrene units of between 25% and 35%, limits included, by weight of the total weight of the copolymer, and a proportion of trans-1,4-bonds of between 73% and 83%, limits included, by weight of the total weight of the butadiene part of the copolymer.

Among other optional characteristics of the styrene-butadiene copolymer, the proportion of styrene units is between 27% and 31%, limits included, by weight of the total weight of the copolymer, in this instance 29%.

In addition, for example, the proportion of trans-1,4-bonds is between 73% and 83%, limits included, by weight of the total weight of the butadiene part of the copolymer, in this instance 78%.

Preferably, the copolymer comprises a proportion of cis-1,4-bonds of between 12% and 21%, limits included, preferably between 14% and 19%, limits included, by weight of the total weight of the butadiene part of the copolymer, in this instance 15%.

Optionally, the copolymer comprises a proportion of vinyl units of between 1% and 7%, limits included, preferably between 3% and 5%, limits included, by weight of the total weight of the butadiene part of the copolymer.

For example, the glass transition temperature Tg of the styrene-butadiene copolymer, measured according to the standard ASTM D-3418, is between −51° C. and −59° C., limits included, and preferably between −53° C. and −57° C., limits included, in this instance Tg=−55° C.

Preferably, the reinforcing filler predominantly comprises carbon black by weight, for example between 20 and 70 phr, limits included, preferably between 30 and 70 phr, limits included, and more preferably between 35 and 60 phr, limits included, of carbon black, in this instance 45 phr.

Preferably, the Mooney plasticity of the composition is greater than or equal to 70 Mooney units, preferably greater than or equal to 75 Mooney units and more preferably greater than or equal to 80 Mooney units, in this instance equal to 80 Mooney units.

An example of a cord according to a second embodiment has been represented in FIG. 3. The elements analogous to those illustrated with reference to the preceding embodiment are denoted by identical references.

Unlike the cord according to the first embodiment, the cord 30 of the second embodiment is of the type having cylindrical layers.

Each layer C1, C2 exhibits a cylindrical exterior which gives each corresponding layer C1, C2 its substantially circular outline.

In an alternative form, the directions of winding of the layer threads are all identical, that is to say either in the S direction ("S/S" arrangement) or in the Z direction ("Z/Z" arrangement) and p1≠p2. In another alternative form, the directions of winding of the layer threads are different and p1=p2. In yet another alternative form, the directions of winding of the layer threads are different and p1≠p2.

An example of a cord according to a third embodiment has been represented in FIG. 4. The elements analogous to those illustrated with reference to the preceding embodiments are denoted by identical references.

Unlike the cord according to the first embodiment, the cord 30 according to the third embodiment comprises an external layer C3 consisting of P external threads with a diameter d3 wound into a helix around the intermediate layer C2 at a pitch p3. In this instance, M=1, N=6 and P=12.

The cord 30 is of the compact type. Thus, the directions of winding of the layer threads are all identical, that is to say either in the S direction ("S/S/S" arrangement) or in the Z direction ("Z/Z/Z" arrangement) and p1=p2=p3.

In addition, in this example, d1>d2=d3. It might also be possible to have d1=d2=d3.

The cord 30 according to the third embodiment also comprises a layer 34 of a rubber composition sheathing the intermediate layer C2. For any length of cord of 2 cm or more, the layer 34 is present in each of the gaps or capillaries located between the N threads of the intermediate layer C2 and the P threads of the external layer C3.

The rubber composition of the layer 34 is identical to that of the layer 32.

An example of a cord according to a fourth embodiment has been represented in FIG. 5. The elements analogous to those illustrated with reference to the preceding embodiments are denoted by identical references.

Unlike the cord according to the second embodiment, the cord 30 according to the fourth embodiment comprises an external layer C3 consisting of P external threads with a diameter d3 wound into a helix around the intermediate layer C2 at a pitch p3. In this instance, M=1, N=6 and P=12.

In addition, in this example, d1>d2=d3. It might also be possible to have d1=d2=d3.

The cord 30 according to the fifth embodiment also comprises a rubber layer 34 sheathing the intermediate layer C2. The characteristics of this layer 34 are deduced mutatis mutandis from those of the layer 34 of the fourth embodiment.

An example of a multistrand rope according to the invention and denoted by the general reference 40 has been represented in FIG. 6.

The multistrand rope 40 is of the type comprising two cylindrical layers. The cord 40 comprises an internal layer I consisting of K internal strand(s) IS(s); in this instance, K=1. The cord 40 also comprises an external layer E consisting of L external strands ESs; in this instance, L=6. The external strands ESs are wound into a helix around the internal layer I.

Each strand IS, ES is composed of a cord 30 according to the second embodiment illustrated in FIG. 3.

Examples of Semifinished Products According to the Invention

The cord according to the invention can be embedded in a semifinished product, for example by calendering, in a coating rubber composition. The coating composition can be identical to or different from the composition for sheathing the cord according to the invention.

Example of a Process According to the Invention

A description will now be given, by way of example, of the main stages of the process for the manufacture of the metal cord rubberized in situ 30 according to the first embodiment. The processes for the manufacture of the cords according to the other embodiments are deduced therefrom mutatis mutandis.

First of all, the styrene-butadiene copolymer is manufactured, for example by solution copolymerization. In a reaction for the formation of a copolymerization cocatalyst, a solvent, for example cyclohexane, barium ethyl glycolate and trioctylaluminium are mixed in a reactor maintained under nitrogen. The reaction temperature is maintained at 40° C. for 20 minutes. In a copolymerization reaction, a solvent, for example cyclohexane, butadiene, styrene, the cocatalyst formed above and a reaction initiator, for example n-butyllithium, are mixed in a reactor maintained under nitrogen. The temperature of the copolymerization reaction is maintained above 80° C. for 40 minutes. The copolymerization reaction is halted with methanol. As is well known to a person skilled in the art, the elastomer is separated from its polymerization solvent either by evaporation under vacuum or by steam distillation. The product thus obtained can, for example, be dried in an oven.

The composition for sheathing the cord according to the invention is manufactured in appropriate mixers using two successive preparation phases well known to a person skilled in the art: a first phase of thermomechanical working or kneading (sometimes described as "nonproductive" phase) at high temperature, up to a maximum temperature (denoted Tmax) of between 110° C. and 190° C., preferably between 130° C. and 180° C., followed by a second phase of mechanical working (sometimes described as "productive" phase) at a lower temperature of less than 50° C., in this instance equal to 30° C., during which finishing phase the vulcanization system is optionally incorporated.

By way of example, the first (nonproductive) phase is carried out in a single thermomechanical stage during which, in a first step, all the necessary base constituents (diene elastomer, reinforcing filler and optional coupling agent) are introduced into an appropriate mixer, such as a normal internal mixer, followed, in a second step, for example after kneading for 1 to 2 minutes, by the optional additional processing aids and various other additives. The total duration of the kneading in this nonproductive phase is preferably between 2 and 10 minutes.

After cooling the mixture thus obtained, the incorporation is then carried out of the vulcanization system comprising in particular sulphur, optionally the vulcanization accelerator and, if this was not done during the nonproductive phase, zinc oxide and stearic acid, generally in an external mixer, such as an open mill. The combined product is then mixed (productive phase) for a few minutes, for example between 5 and 15 minutes.

The sheathing composition is then obtained.

Subsequently, the cord is assembled and at least an internal portion of the cord, in this instance the internal layer C1, is sheathed with the rubber composition by employing, for example, a process as described in the document WO 2009/083213. In this process, the internal layer C1 is sheathed between the stage of assembling the internal layer C1 and the stage of assembling the external layer C2.

In the case of the cords of the third and fourth embodiments illustrated in FIGS. 4 and 5, the cord is assembled and the internal layer C1 and the intermediate layer C2 are sheathed by employing, for example, a process as described in the document WO 2010/054791. In this process, first, the internal layer C1 is sheathed between the stage of assembling the internal layer C1 and the stage of assembling the intermediate layer C2 and, secondly, the intermediate layer C2 is sheathed between the stage of assembling the intermediate layer C2 and the stage of assembling the external layer C3.

Comparative Tests

A "Control" composition in accordance with the state of the art known to a person skilled in the art and an "Invention" composition in accordance with the composition of the cord according to the invention were compared. The "Invention" composition is that of the layers 32, 34 of the various embodiments of the cords according to the invention above.

Unlike the "Control" composition, the "Invention" composition comprises a styrene-butadiene copolymer comprising:

a proportion of styrene units of between 25% and 35%, limits included, by weight of the total weight of the copolymer, and a proportion of trans-1,4-bonds of between 73% and 83%, limits included, by weight of the total weight of the butadiene part of the copolymer.

Each "Control" and "Invention" composition is prepared according to a process in accordance with the process according to the invention, except for the nature of the diene elastomer for the "Control" composition.

The amounts of the components of the "Control" and "Invention" compositions are collated in Table 1 below and are expressed in parts per 100 parts by weight of elastomer (phr).

TABLE 1

| Composition | Control | Invention |
| --- | --- | --- |
| Styrene-butadiene copolymer | 0 | 100 |
| Natural rubber | 100 | 0 |
| Carbon black | 45 | 45 |
| Antioxidant | 1.5 | 1.5 |
| ZnO | 8 | 8 |
| Stearic acid | 1 | 1 |
| Sulphur | 6 | 6 |

TABLE 1-continued

| Composition | Control | Invention |
|---|---|---|
| Accelerator | 1 | 1 |
| Cobalt naphthenate | 1 | 1 |

The antioxidant is N-(1,3-dimethylbutyl)-N-phenyl-para-phenylenediamine (Santoflex 6-PPD from Flexsys). The vulcanization accelerator is N,N-dicyclohexyl-benzothiazolesulphenamide (Santocure DCBS from Flexsys).

Properties Before Curing

Mooney Plasticity

The Mooney plasticity is produced by using a consistometer according to Standard ASTM D 1646-99. The Mooney plasticity is measured according to the following principle: the generally raw mixture is moulded in a cylindrical chamber heated to a given temperature, usually 100° C. After preheating for one minute, a rotor of L type rotates within the test specimen at 2 revolutions per minute and the working torque for maintaining this movement is measured after rotating for 4 minutes. The Mooney plasticity (ML 1+4) is expressed in "Mooney unit" (MU, with 1 MU=0.83 newton.meter). This measurement is carried out before the stage of sheathing the metal cord and less than 24 h after the manufacture of the rubber composition.

Properties of the Cord

A control cord having the 1+6+12 structure and a cord according to the invention having the 1+6+12 structure in accordance with the fourth embodiment were compared.

Diameter of the Cord

The relative diameter is the ratio of the diameter of the rubberized "Control" cord to the diameter of the cord observed.

Air Permeability Test

This test makes it possible to determine the longitudinal permeability to air of the cords tested, by measuring the volume of air passing through a test specimen under constant pressure during a given period of time. The principle of such a test, which is well known to a person skilled in the art, is to demonstrate the effectiveness of the treatment of a cord in order to render it impermeable to air; it has been described, for example, in Standard ASTM D 2692-98.

The test is carried out here on raw manufactured cords which have been subjected to a subsequent coating and a subsequent curing. The raw cords, prior to the test, have to be coated from the outside with a "coating" rubber. For this, a series of 10 cords positioned in parallel (intercord distance: 20 mm) is placed between two skims (two rectangles of 80×200 mm) of a rubber composition in the raw state, each skim having a thickness of 3.5 mm; the combined assembly is then clamped in a mould, each of the cords being kept under a sufficient tension (for example 2 daN) to guarantee that it remains straight when being placed in the mould, using clamping modules; the vulcanization (curing) is then carried out at a temperature of 140° C. and under a pressure of 15 bar (rectangular piston of 80×200 mm) over 40 min. After this, the assembly is removed from the mould and 10 test specimens of cords thus coated are cut out, in the form of parallelepipeds having appropriate dimensions (for example, 7×7×20 or 7×7×30 mm), for characterization. Use is made, as coating composition, of a conventional rubber composition for tyres, based on natural (peptized) rubber and on N330 carbon black (65 phr), additionally comprising the following usual additives: sulphur (7 phr), sulphenamide accelerator (1 phr), ZnO (8 phr), stearic acid (0.7 phr), antioxidant (1.5 phr) or cobalt naphthenate (1.5 phr); the real modulus secant of the coating rubber at 10% E10 is 10 MPa approximately.

The test is carried out under a predetermined length (for example 3 cm, indeed even 2 cm) of cord, thus coated with its surrounding coating rubber in the cured state, in the following way: air is sent to the inlet of the cord, under a pressure of 1 bar, and the volume of air at the outlet is measured using a flow meter (calibrated, for example, from 0 to 500 cm$^3$/min). During the measurement, the sample of cord is immobilized in a compressed airtight seal (for example a seal made of dense foam or of rubber) so that only the amount of air passing through the cord from one end to the other, along its longitudinal axis, is taken into account by the measurement; the airtightness of the airtight seal itself is monitored beforehand using a solid rubber test specimen, that is to say one devoid of cord.

The lower the mean air flow rate measured (mean over the 10 test specimens), the higher the longitudinal impermeability of the cord. As the measurement is carried out with an accuracy of ±0.2 cm$^3$/min, measured values of less than or equal to 0.2 cm$^3$/min are regarded as zeros; they correspond to a cord which can be described as airtight (completely airtight) along its axis (i.e., in its longitudinal direction). In the air permeability test described above, a cord said to be "airtight" in the longitudinal direction is characterized by a mean air flow rate of less than or at the most equal to 0.2 cm$^3$/min.

External Appearance

The grade of external appearance corresponds to a human observation of the cord after its manufacture. If no particle of rubber is visible to the naked eye at the periphery of the cord, the grade is equal to 5. In this case, a person skilled in the art is incapable of telling the difference between a cord rubberized in situ and a cord of analogous structure not comprising rubber. If the cord is completely covered with rubber, the grade is equal to 0. Between these two grades, the more the cord is covered with rubber, the lower the grade. The grade 3 corresponds to a cord comprising isolated points of radial overflowing of the rubber.

TABLE 2

|  | Control | Invention |
|---|---|---|
| Properties before curing | | |
| Mooney (MU) | 69.80 | 80.00 |
| Properties of the cord | | |
| Relative diameter | 1 | 0.99 |
| APA | 100% | 90% |
| External appearance | 3 | 5 |

The Mooney plasticity ML(1+4) of the "Invention" composition is significantly greater than that of the "Control" composition. The fluidity of the "Invention" composition is thus less than that of the "Control" composition, which prevents radial overflowing of the composition.

It is noted that the cord according to the invention exhibits a diameter which is substantially equal to, indeed even slightly less than, that of the control cord, which testifies to a better confinement of the sheathing composition inside the cord.

It is noted that the cord according to the invention exhibits a penetrability substantially equivalent to that of the control cord. 100% of the measurements carried out on the control cord result in a flow rate of less than or at the most equal to 0.2 cm³/min and 90% of the measurements carried out on the cord of the invention result in a flow rate of less than or at most equal to 0.2 cm³/min. It is considered that the result of 90% is easily sufficient for the cord to be sufficiently well penetrated by the rubber.

It is noted that the cord according to the invention exhibits an appearance grade which is greater than that of the control cord. Thus, the cord according to the invention does not exhibit rubber at its periphery, which makes it possible to avoid fouling of the manufacturing plant and thus shutdowns of the latter.

The invention is not limited to the embodiments described above.

Some threads might have a noncircular section, for example a plastically deformed section, in particular a substantially oval or polygonal section, for example a triangular, square or also rectangular section.

The threads having a circular or noncircular section, for example a wavy thread, can be spiral, twisted into a helical shape or twisted into a zigzag shape. In such cases, it should, of course, be understood that the diameter of the thread represents the diameter of the imaginary cylinder of revolution which surrounds the thread (clearance diameter) and no longer the diameter (or any other transverse size, if its section is not circular) of the core thread itself.

For reasons of industrial feasibility, of cost and of overall performance, it is preferable to implement the invention with linear threads, that is to say straight threads, having a circular conventional cross-section.

The cord can also comprise a hooping layer consisting of a wrapping wire wound into a helix around the external layer.

It will also be possible to combine the characteristics of the various embodiments described or envisaged above, with the proviso that these characteristics are compatible with one another.

The invention claimed is:

1. A metal cord comprising a rubber composition used to rubberize the metal cord in situ, wherein the rubber composition includes a styrene-butadiene copolymer, and wherein the styrene-butadiene copolymer includes:
   styrene units at a proportion of between 27% and 31% by weight, limits included, of a total weight of the styrene-butadiene copolymer, and
   trans-1,4-bonds at a proportion of between 73% and 83% by weight, limits included, of a total weight of a butadiene part of the styrene-butadiene copolymer.

2. The metal cord according to claim 1, wherein the proportion of the trans-1,4-bonds is between 75% and 81% by weight, limits included, of the total weight of the butadiene part of the styrene-butadiene copolymer.

3. The metal cord according to claim 1, wherein the styrene-butadiene copolymer includes cis-1,4-bonds at a proportion of between 12% and 21% by weight, limits included, of the total weight of the butadiene part of the copolymer.

4. The metal cord according to claim 3, wherein the styrene-butadiene copolymer includes cis-1,4-bonds at a proportion of between 14% and 19% by weight, limits included, of the total weight of the butadiene part of the copolymer.

5. The metal cord according to claim 1, wherein the styrene-butadiene copolymer includes vinyl units at a proportion of between 1% and 7% by weight, limits included, of the total weight of the butadiene part of the copolymer.

6. The metal cord according to claim 5, wherein the styrene-butadiene copolymer includes vinyl units at a proportion of between 3% and 5% by weight, limits included, of the total weight of the butadiene part of the copolymer.

7. The metal cord according to claim 1, wherein the rubber composition includes between 50 and 100 phr, limits included, of the styrene-butadiene copolymer.

8. The metal cord according to claim 7, wherein the rubber composition includes between 70 and 100 phr, limits included, of the styrene-butadiene copolymer.

9. The metal cord according to claim 8, wherein the rubber composition includes between 80 and 100 phr, limits included, of the styrene-butadiene copolymer.

10. The metal cord according to claim 1,
   wherein the metal cord is embedded in a coating rubber composition, and
   wherein the metal cord embedded in the coating rubber composition is incorporated in a semifinished product.

11. The metal cord according to claim 1, wherein the metal cord is incorporated in a tire.

12. A process for manufacturing a metal cord that is rubberized in situ, the process comprising steps of:
   manufacturing a rubber composition that includes a styrene-butadiene copolymer, wherein the styrene-butadiene copolymer includes:
      styrene units at a proportion of between 27% and 31% by weight, limits included, of a total weight of the styrene-butadiene copolymer, and
      trans-1,4-bonds at a proportion of between 73% and 83% by weight, limits included, of a total weight of a butadiene part of the styrene-butadiene copolymer; and
   between two stages of assembling the metal cord, sheathing at least an internal portion of the metal cord with the rubber composition.

* * * * *